Jan. 29, 1952 A. ROELANDTS 2,583,796
SHUTTLE
Filed Jan. 22, 1949 3 Sheets-Sheet 3
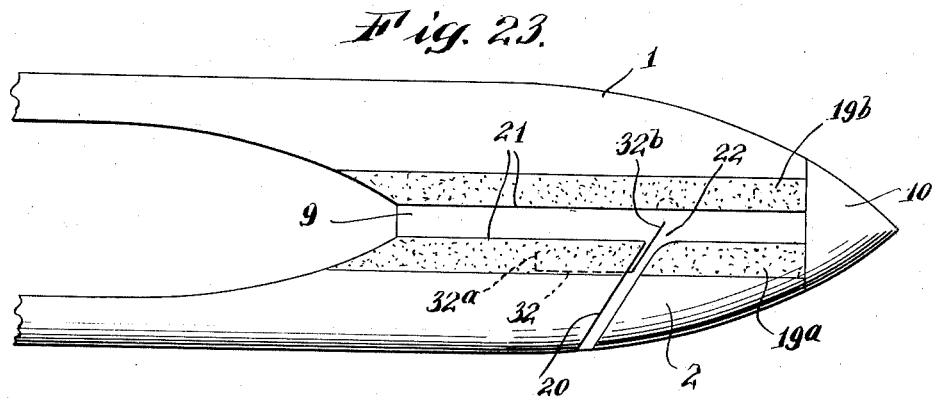
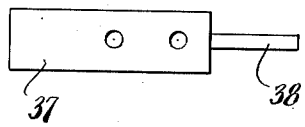
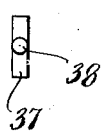
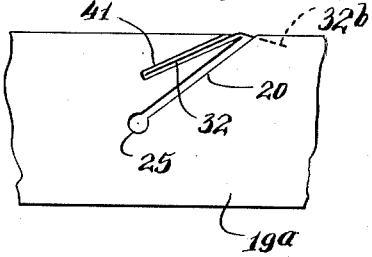
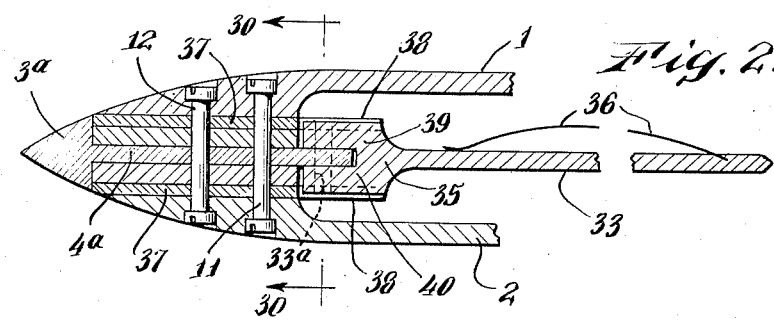
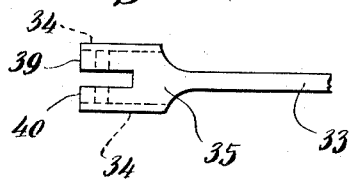
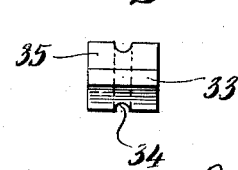
INVENTOR.
ADELSON ROELANDTS
BY
Hazeltine, Lake & Co.
AGENTS.

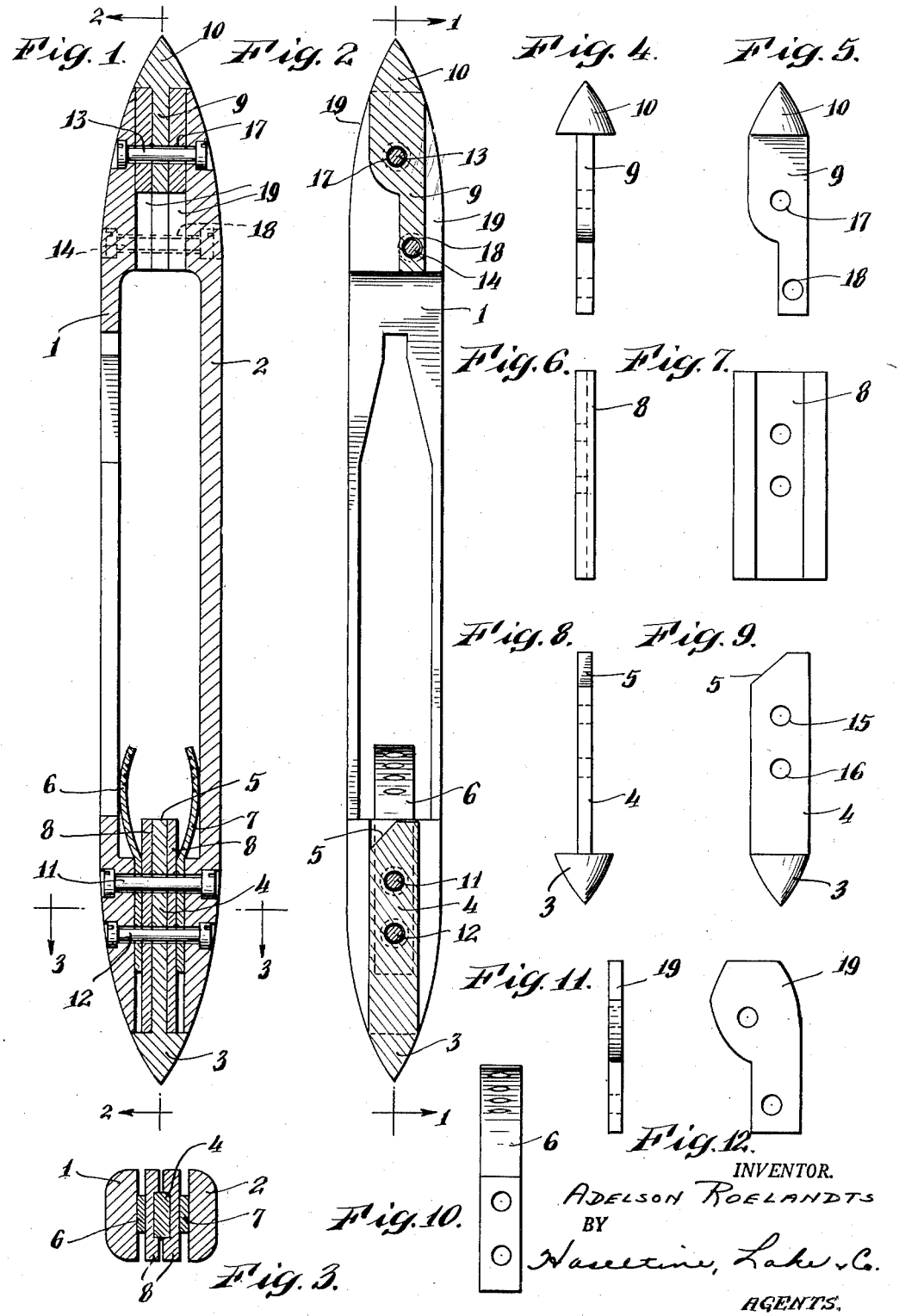

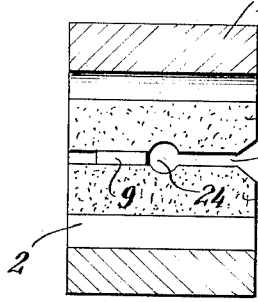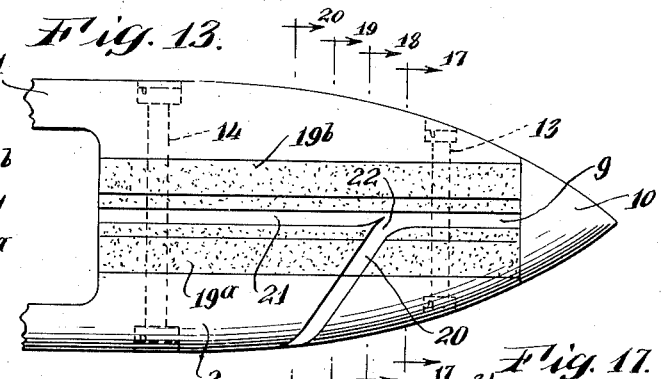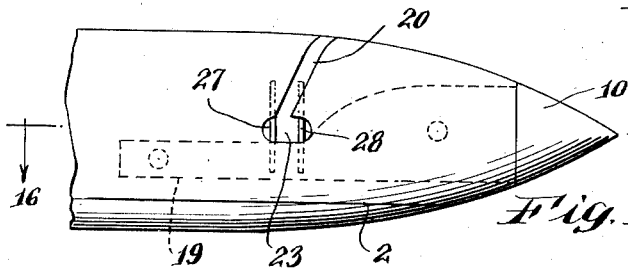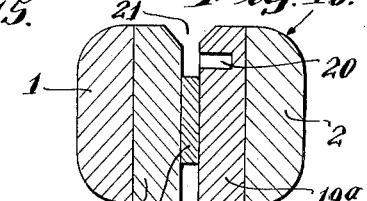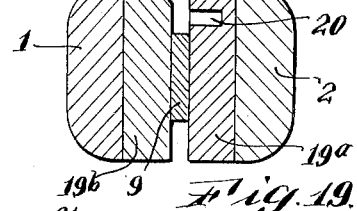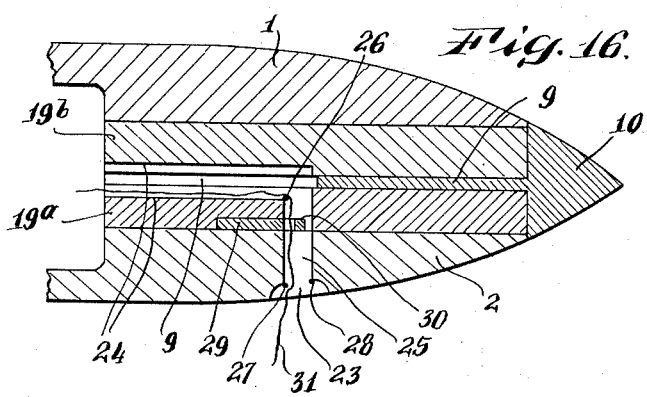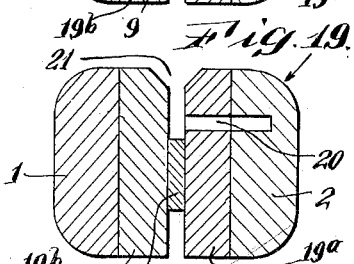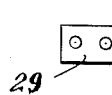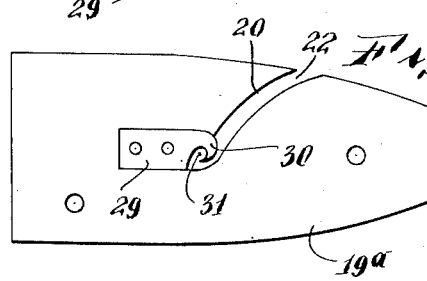

Patented Jan. 29, 1952

2,583,796

UNITED STATES PATENT OFFICE 2,583,796

SHUTTLE

Adelson Roelandts, Mont-St. Amand-Lez-Gand, Belgium

Application January 22, 1949, Serial No. 72,237
In Belgium September 11, 1948

9 Claims. (Cl. 139—196)

The present invention relates to shuttles for automatic or regular weaving looms.

An object of the present invention is to provide a shuttle for regular or automatic weaving looms which is designed and constructed to achieve a great economy in the use of wood or other material necessary for its manufacture, a saving in the neighborhood of 50% being realized in the use of material over that required for shuttles heretofore proposed.

Another object is to provide a shuttle of the character described, which is constructed and arranged to achieve the aforesaid economical utilization of material, and wherein the solid body of the shuttle tips is reinforced and the cop is rigidly maintained in its position on the longitudinal axis of the shuttle without permitting any oscillation of the cop from that position.

The foregoing objects are accomplished by providing a shuttle made up of separate parts, forming the various elements thereof, which are appropriately shaped and assembled together in a rigid manner.

In accordance with the present invention, a shuttle for non-automatic looms is provided with a shuttle tip body at the holding side of the cop having a central reinforcing member and a cop-holding rod hinged on the inner extremity of the latter. Each of the exterior faces of the reinforcing member is provided with a semi-circular groove in which corresponding parts of extensions of circular cross-section of a holding clip for the cop-holding rod are adapted to engage when in horizontal position.

In a shuttle for automatic looms, embodying the present invention, the body of the shuttle tips is designed so that the usual spiral member is replaced by an assembly of spacers on the side faces of the central reinforcing member, with one of the spacers being formed to guide or thread the weft yarn up to its outlet.

The above, and other objects, features and advantages, of the present invention will be apparent in the following detailed description of illustrative embodiments thereof, which is to be read in connection with the accompanying drawings forming a part hereof and wherein:

Fig. 1 is a longitudinal sectional view, in a horizontal plane, along the line 1—1 of Fig. 2, of a shuttle constructed in accordance with an embodiment of the present invention;

Fig. 2 is a longitudinal sectional view taken along the line 2—2 of Fig. 1;

Fig. 3 is a transverse sectional view taken along the line 3—3 of Fig. 1;

Figs. 4 and 5 are elevational views, looking in the same directions as Figs. 1 and 2, respectively, and showing a tip body located at the upper end of the shuttle in Figs. 1 and 2;

Figs. 6 and 7 are elevational views, looking in the same directions as Figs. 1 and 2, respectively, and showing a spacer incorporated in the lower tip construction of the shuttle of Figs. 1 and 2;

Figs. 8 and 9 are elevational views, looking in the same directions as Figs. 4 and 5, respectively, but showing the lower tip body included in the shuttle illustrated in Figs. 1 and 2;

Fig. 10 is an elevational view, looking in the direction of Fig. 2, of one of the arms of a cop-holding clip of the shuttle of Figs. 1 and 2;

Figs. 11 and 12 are elevational views, looking in the same directions as Figs. 4 and 5, respectively, and showing a spacer incorporated in the upper tip construction of the shuttle of Figs. 1 and 2;

Fig. 13 is a fragmentary plan view, on an enlarged scale, of the upper or threader end of the shuttle of Figs. 1 and 2;

Fig. 14 is an end view of the threader and shown in Fig. 13 and looking at said end from the cop side thereof;

Fig. 15 is a side elevational view of the threader end portion illustrated in Fig. 13, and showing the yarn outlet;

Fig. 16 is a longitudinal sectional view in a horizontal plane and taken along the line 16—16 of Fig. 15;

Figs. 17, 18, 19 and 20 are transverse sectional views taken along the lines 17—17, 18—18, 19—19 and 20—20 of Fig. 13, respectively;

Fig. 21 is an elevational view of an element included in the illustrated shuttle;

Fig. 22 is an elevational view of a side face of the spacer located at the inside of the side plate at the yarn outlet end of the illustrated shuttle;

Fig. 23 is a fragmentary plan view of the threader end of a shuttle embodying the present invention and having a threader point;

Fig. 24 is an elevational view of the outside face of a spacer included in the construction of Fig. 23 and showing the position and manner of attachment of the threader point;

Fig. 25 is a longitudinal sectional view in a horizontal plane of an end portion of a shuttle for non-automatic looms, showing the details of construction ensuring the correct positioning of the cop;

Figs. 26 and 27 are respectively side and end elevational views of a clip provided in the construction of the shuttle of Fig. 25 for securing the cop-holding rod thereof;

Figs. 28 and 29 are respectively a fragmentary plan view and an end view of the cop-holding rod showing the details of construction thereof at its secured or supported end; and Fig. 30 is a transverse sectional view taken along the line 30—30 of Fig. 25.

Referring to the drawings in detail, and initially to Figs. 1 to 12 thereof, a shuttle embodying the present invention is there shown to include side plates or walls 1 and 2 which at their opposite ends are joined to assemblies forming shuttle tips. The shuttle tip at the cop-holding end, the lower end as viewed in Figs. 1 and 2, comprises a central metal reinforcing member, shown in detail in Figs. 8 and 9, which is located in the longitudinal axis of the shuttle and includes a conical head or tip 3 integral with a body portion 4. The body portion 4 constitutes a holding plate and is formed with holes 15 and 16 and with a beveled edge 5 at its end remote from the tip 3 to form the stop for the cop. Spacers 8, seen in detail in Figs. 6 and 7, are disposed against the opposite faces of the body portion 4 and are similarly formed with holes registering with the holes 15 and 16. Arms 6 and 7, one of which appears in detail in Fig. 10, are disposed between the interior faces of the side plates 1 and 2, respectively, and the outer faces of the spacers 8 on the adjacent sides of the body portion 4 and are formed with holes in the base or supported portions thereof matching with the holes 15 and 16. The arms 6 and 7 extend into the central space between the plates 1 and 2 and cooperate to provide a cop-holding clip. Finally, the elements at the cop-holding end of the shuttle are all held together in assembled relationship by bolts or rivets 11 and 12 (Figs. 1 and 2) extending therethrough.

The tip assembly formed as above provides a compact and solid shuttle tip capable of resisting or standing up under the repeated blows received by the shuttle during the operation of a loom. Since the arms 6 and 7, constituting a cop-holding clip, are securely held by the bolts or other securing means 11 and 12 in the plane of the central axis of the shuttle, the cop will be constrained from movement in the rectilinear direction of this axis. The described manner of securing the cop-holding clip, having the related effect on the cop held therein, will thus provide for the easy and smooth running of the weft yarn to avoid breaking the latter, particularly as the end of the weft yarn on the cop is approached.

The tip assembly at the other end of the shuttle is similar in some respects to that just described, and includes in this modification a central metal reinforcing member, shown in detail in Figs. 4 and 5, and formed with a conical head or tip 10 integral with a body portion 9 having holes 17 and 18 extending therethrough and terminating in a relatively narrow portion, remote from the tip 10, which may be used for attaching the usual spiral threader (not shown). Spacers 19a and 19b are interposed between the opposite sides of the body portion 9 and the adjacent inside faces of the related end portions of side plates 1 and 2, the tip assembly consisting of the central reinforcing member 9, 10, the spacers 19a and 19b and the adjacent end portions of the side plates 1 and 2 is held together by bolts or other securing members 13 and 14 extending therethrough, with the bolt 13 extending through the hole 17, on the central axis of the body portion 9, and the bolt 14 passing through the hole 18 which is located slightly below that axis.

The walls or side plates 1 and 2 constitute the two principal elements of the shuttle assembly according to the present invention and are usually fabricated from wood. Since these two parts may be cut separately, a saving of at least 50% may be effected in the amount of wood required over that required when the equivalents of the side plates are cut in one piece from a single wood block, as in prior shuttles. Further, the side plates 1 and 2, as well as the spacers 8 and 19, may be formed of materials other than wood, such as, for example, fibre, compressed material, light metals, alloys, moulded parts or the like, with little or no waste of these materials being encountered.

Figs. 13 to 22 inclusive, illustrate further details of the construction of the threader end of the shuttle, that is, the upper end of the shuttle as viewed in Figs. 1 and 2. The spacers 19a and 19b, being separated by the body portion 9 of the central reinforcing member, define a groove or slot 21 between their confronting inner faces in the area above the narrowed part of the body portion 9, as seen in Figs. 13, 14 and 17 to 20, through which the weft yarn 31 (Figs. 16 and 20) may easily pass when being withdrawn from the cop.

The insert 19a and the adjacent end portion of the side wall 2 are cut to provide an oblique groove or slot 20 opening laterally from the slot 21. The bottom of the oblique slot 20 is formed by an enlarged lateral passage 25 opening at its inner end to the bottom portion 24 of the longitudinal slot 21. As seen in Figs. 14 and 20, the bottom portion 24 of the longitudinal slot 21 is cylindrical in shape and is defined by semi-cylindrical channels formed in the confronting faces of the spacers 19a and 19b and equal in length to the narrowed portion of the body 9 of the central reinforcing member. The passage 25 opens outwardly through the aperture 23 formed in the outside face of the side plate 2.

As seen in Fig. 13, the spacer 19a, at the confluence of the slots 20 and 21, is formed with a pointed projection 22 on the side of slots 20 remote from the tip 10. The pointed projection 22 is formed with a concave curved back edge and extends partially across the slot 21 while being bent slightly downward so that the weft thread 31 may be drawn from the cop past the projection 22 in the direction toward the tip 10 and the projection 22 prevents removal of the thread from the slots on the return movement of the shuttle.

A plate 29 (Figs. 21 and 22) is secured to the outer side of the spacer 19a and includes a hooked portion 30 extending into the passage 25 at the bottom of the oblique lateral slot 20 to prevent upward removal of the weft thread from the latter. A chafing rod or strip 26, preferably formed of metal, is located on the inside of the spacer 19a at the junction of the bottom portions or passages 24 and 25 of the slots 21 and 20, respectively, (Figs. 16 and 20) and other chafing rods or strips 27 and 28 are disposed at the opposite sides of the outlet aperture 23 (Figs. 15 and 16) for the purpose of ensuring the smooth and friction free running of the yarn 31 past these locations.

Instead of providing the spacer 19a with a projection 22, as in Fig. 13, a threader point or rod 32 may be arranged as shown in Figs. 23 and 24 and includes an end portion 32a bent substantially at a right angle relative to the longitudinal axis of the shuttle and an opposite end portion 32b forming an obtuse angle with the central portion of the rod 32.

The end portion 32a is imbedded in a suitable hole of the spacer 19a (Fig. 23) to anchor the rod 32 with the central portion of the latter residing in a suitably upwardly inclined groove 41 formed in the outer face of the spacer 19a (Fig. 24). The rod 32 is held in place in the receiving groove between the contacting faces of the spacer 19a and the side plate 2. Rod 32 extends into the lateral slot 20 at the point where end portion 32b is bent relative to the central portion thereof. End portion 32b follows slot 20 and continues beyond the junction of the slots 20 and 21 to extend into the latter. Such an arrangement of the rod 32 provides for the firm maintenance of the latter in its fixed position without any possibility of rotation or twisting of the end portion 32b.

Figs. 25 to 30, inclusive, illustrate the cop-holding end portion of a shuttle for non-automatic looms and constructed in accordance with another embodiment of the present invention. In this embodiment, a cop-holding rod 33 is formed with a bifurcated part or fork 35 at one end which is hinged to the extremity of the central reinforcing member 4a, by means of a pin 33a (Fig. 25), and maintained thereon by its legs 39 and 40, as will be explained hereinafter.

The above described hinge mounting for the rod 33 permits swinging of the latter from the illustrated position, aligned with the longitudinal axis of the shuttle, to a position approximately at a right angle thereto so that, with the rod 33 in the last mentioned position, the operator may manually remove an empty cop and replace it with a full cop.

The cop-holding rod 33, terminating in the fork 35 having legs 39 and 40, when in its horizontal position in alignment with the longitudinal axis of the shuttle, is maintained fixed and rigid by two extremities 38 extending from the arms 37 which form a retaining clip for the cop-holding rod and are secured to the shuttle tip assembly in the same manner as the arms 6 and 7 of the shuttle (Figs. 1 and 2) for automatic looms previously described.

Each of the arms 37 is flat and elongated in configuration and the extremity 38 is resilient and of rounded cross-section having a diameter equal to the thickness of the flat arm 37 (Figs. 26 and 27). The outer face of each of the legs 39 and 40 is formed with a groove 34 of semi-cylindrical cross-section (Figs. 28 and 29) to receive the related extremity 38 of the retaining clip assembly which then hold the rod 33 in its fixed operative position. A spring 36, in the form of a curved resilient wire secured on the rod 33, is provided for retaining a cop on the latter.

The transverse bolts 11 and 12 hold together the assembly of the side plates 1 and 2, arms 37, spacers and central reinforcing member 4a.

As the yarn threader arrangements previously described have no application in shuttles for non-automatic looms, the spacers in the tip construction of the shuttle of Figs. 25 to 30 are provided merely to obtain the desired spacing between the side walls 1 and 2, and a suitable eyelet (not shown) formed of porcelain, glass or other material, is fitted in the side wall 2 as in conventional shuttles.

When the rod 33 is pivoted through approximately a right angle to permit replacement of the cop, the rounded extremities 38 ride out of the grooves 34 in the legs 39 and 40, and then return to such grooves on the return of the cop-holding rod 33 to its operative position lying in the longitudinal axis of the shuttle.

From the foregoing it is apparent that the present invention provides shuttles having advantages as follows:

A saving of approximately 50% in the amount of material required in its manufacture;

The possibility of using materials other than wood in their manufacture;

The maintenance of the cop in fixed operative position aligned with the longitudinal axis of the shuttle by virtue of the retaining clips formed of separate arms so that the possibility of breaks in the weft thread is materially decreased, and, consequently, numerous stoppages of the loom are eliminated;

Increased strength at the opposite tips of the shuttles; and

Elimination of the conventional spiral threader.

While I have described and illustrated preferred embodiments of the present invention, it is to be understood that the invention is not limited to those precise embodiments and that many changes and modifications may be effected therein without departing from the scope and spirit of the invention as defined in the appended claims.

What I claim is:

1. A shuttle for weaving looms comprising a plurality of assembled elements including two side members, two tip members, and a plurality of spacers, each tip member comprising a tip and a longitudinal body portion extending along the axis of the shuttle, each side member having two plane surfaces parallel to the sides of the tip member body portions, said spacers being located between the plane surfaces of the side members and the sides of the body portions, the side members, spacers and body portions being apertured and at least one securing member traversing the shuttle from side to side at each end thereof to retain the side members, spacers and tip members in assembled position, two members, interposed between the spacers and the plane surfaces of said side members at one end of the shuttle and having resilient portions extending therefrom toward the interior of the shuttle thereby to provide a resilient cop-holding clip and means being provided on at least one of the spacers at the other end of the shuttle to enable passage therethrough of the filling thread issuing from the cop.

2. A shuttle in accordance with claim 1 wherein the tip member body portion at the cop-holding end of the shuttle includes a beveled edge against which the cop abuts.

3. A shuttle according to claim 1 wherein the tip member body portion at said other end of the shuttle includes a narrowed portion thereby to provide space for insertion of a thread.

4. A shuttle according to claim 1, particularly for use in non-automatic looms wherein the tip member body portion at the cop-holding end of the shuttle extends beyond the related spacers into the interior of the shuttle, said shuttle further comprising a cop-holding rod hinged to said extension about an axis transverse to the shuttle axis.

5. A shuttle according to claim 4 wherein said resilient portions extending toward the interior of the shuttle are of circular cross section, the cop-holding rod having grooves in the opposite side faces thereof to accommodate said resilient portions when in cop-holding position.

6. A shuttle according to claim 1 wherein said resilient portions extending toward the interior of the shuttle are curved concavely toward each other.

7. A shuttle according to claim 1 wherein one of the spacers at said other end of the shuttle is provided with a transverse slot extending obliquely across half the thickness of the element, wear resisting means being provided across the entrance to and the exit from the bottom of said slot.

8. A shuttle according to claim 7 wherein the one of said side members, in contact with said one spacer having the transverse slot therein, is provided with a corresponding slot extending into said first slot laterally of the shuttle, the opening of the slot at the outer face of said one side member being provided with wear resisting means.

9. A shuttle according to claim 8, wherein said one of the spacers at said other end of the shuttle is formed with a groove in the outside face thereof inclined relative to the longitudinal axis of the shuttle, said inclined groove terminating at one end in a bore perpendicular thereto and opening at its other end into said transverse slot, the shuttle further comprising a rod inserted in said groove and having an end portion at right angles fitted in said bore and a second end portion extending beyond the end of said inclined groove and into said transverse slot.

ADELSON ROELANDTS.

REFERENCES CITED

The following references are of record in the file of this patent:

UNITED STATES PATENTS

| Number | Name | Date |
|--------|------|------|
| 588,935 | Wood | Aug. 24, 1897 |
| 2,436,356 | Gelpke | Feb. 17, 1948 |